United States Patent [19]
Tibbitts

[11] Patent Number: 5,671,816
[45] Date of Patent: *Sep. 30, 1997

[54] SWIVEL/TILTING BIT CROWN FOR EARTH-BORING DRILLS

[75] Inventor: Gordon A. Tibbitts, Salt Lake City, Utah

[73] Assignee: Baker Hughes Incorporated, Houston, Tex.

[*] Notice: The term of this patent shall not extend beyond the expiration date of Pat. No. 5,503,236.

[21] Appl. No.: 713,951

[22] Filed: Sep. 13, 1996

Related U.S. Application Data

[60] Continuation of Ser. No. 462,780, Jun. 5, 1995, Pat. No. 5,595,254, which is a division of Ser. No. 117,214, Sep. 3, 1993, Pat. No. 5,503,236.

[51] Int. Cl.⁶ .............................. E21B 10/62; E21B 17/05
[52] U.S. Cl. .................. 175/101; 175/343; 285/263; 464/19; 464/152
[58] Field of Search .................. 175/74, 101, 256, 175/320, 327, 342, 343; 285/261, 263; 464/19, 152

[56] References Cited

U.S. PATENT DOCUMENTS

| | | | |
|---|---|---|---|
| 1,702,757 | 2/1929 | Zublin | 175/195 |
| 1,971,480 | 8/1934 | Earley | 175/61 |
| 2,069,603 | 2/1937 | Earley | 175/263 |
| 2,402,238 | 6/1946 | Carpenter | 175/256 |
| 2,779,570 | 1/1957 | Roper | 464/19 |
| 2,938,710 | 5/1960 | Tannehill | 175/79 |
| 3,263,446 | 8/1966 | Wiggns, Jr. | 175/320 X |
| 3,730,286 | 5/1973 | Weiner | 175/320 |
| 4,013,134 | 3/1977 | Richmond et al. | 175/73 |
| 4,485,879 | 12/1984 | Kamp et al. | 175/61 |
| 4,492,276 | 1/1985 | Kamp | 175/61 |
| 4,527,637 | 7/1985 | Bodine | 175/55 |
| 4,610,307 | 9/1986 | Jurgens et al. | 175/320 |
| 4,699,224 | 10/1987 | Burton | 175/61 |
| 4,739,842 | 4/1988 | Kruger et al. | 175/61 |
| 4,739,843 | 4/1988 | Burton | 175/73 |
| 4,848,486 | 7/1989 | Bodine | 175/55 |
| 4,899,835 | 2/1990 | Cherrington | 175/320 X |
| 4,904,228 | 2/1990 | Frear et al. | 464/19 X |
| 5,101,915 | 4/1992 | Witte | 175/74 |
| 5,343,967 | 9/1994 | Kruger et al. | 175/76 X |
| 5,355,968 | 10/1994 | Smith | 175/320 |
| 5,503,236 | 4/1996 | Tibbitts | 175/101 |

FOREIGN PATENT DOCUMENTS

| | | | |
|---|---|---|---|
| 954557 | 9/1982 | U.S.S.R. | 175/393 |
| 1440257 | 4/1966 | United Kingdom | 175/320 |
| 2190411 | 11/1987 | United Kingdom . | |

*Primary Examiner*—David J. Bagnell
*Attorney, Agent, or Firm*—Trask, Britt & Rossa

[57] ABSTRACT

A drill bit for drilling subterranean formations includes a device to provide a "universal" effect between the shank and crown for self alignment of the crown with the bore hole in the formation. The bit is suitable for downhole assemblies configured for straight drilling, directional drilling and navigational drilling. The device can be incorporated into both drag bits and roller-type "rock" bits. Preferred embodiments include a flexible sub connecting the crown to the shank portion and having reduced stiffness relative to the drill string. Alternatively, a spherical universal joint or trunnion type universal is used. Replaceable lugs increase durability and reliability of the universal. The device equalizes the loads on cutters while reducing wear, average loads, and impact loads on cutters. Bore hole diameter and chatter of the bit in the bore hole are reduced, promoting maximum efficiency and rate of penetration as wobble and precession are minimized.

15 Claims, 13 Drawing Sheets

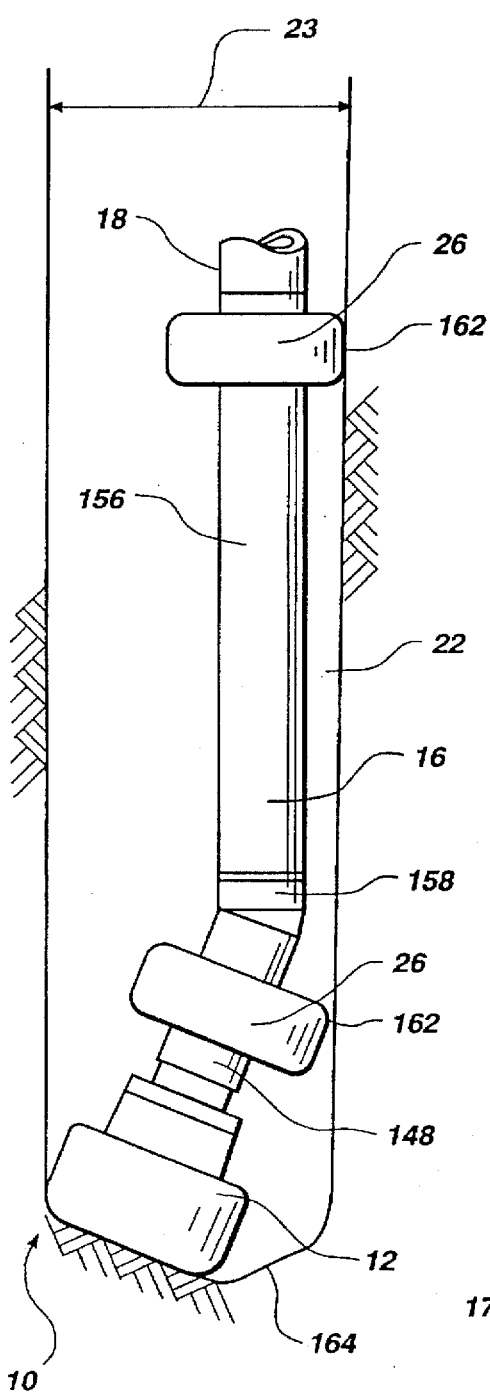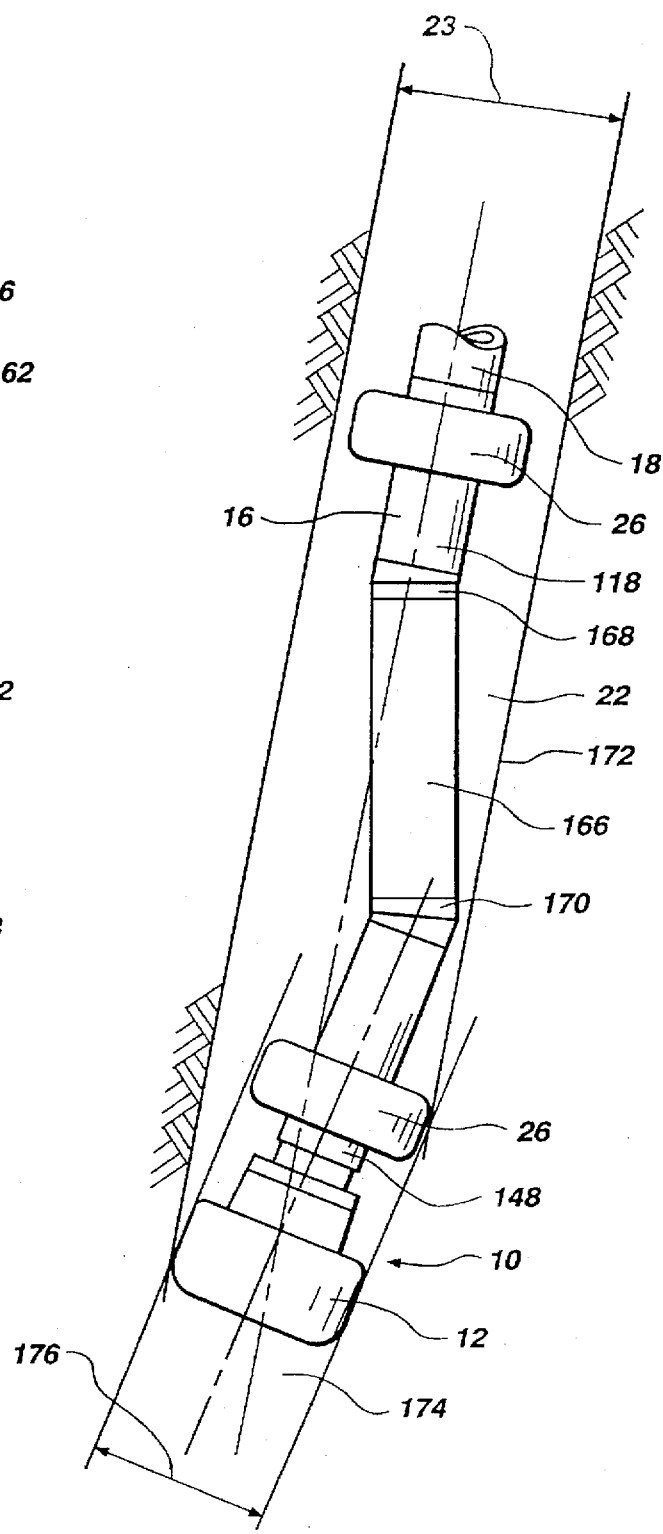
Fig. 24
Fig. 25

SWIVEL/TILTING BIT CROWN FOR EARTH-BORING DRILLS

This is a continuation of application Ser. No. 08/462,780, filed Jun. 5, 1995, now U.S. Pat. No. 5,595,254, which is a divisional of application Ser. No. 08/117,214, filed Sep. 3, 1993, now U.S. Pat. No. 5,503,236.

BACKGROUND OF THE INVENTION

1. Field of the Invention

This invention relates to apparatus for straight and directional drilling of underground formations. More particularly, the invention relates to drill bits for earth-boring drill strings for navigational drilling.

2. State of the Art

The ability to steer a drill string in a preferred direction in earth formations has been developing for several decades. At least two technologies are required.

First, the drilling crew must be able to navigate. That is, the crew must be able to tell where a drill bit at the bottom of the drill string is located in terms of direction, rotational orientation and distance. In recent decades, downhole navigational technology has greatly improved the ability to find the exact position and orientation of a tool at the bottom of a drill string.

The second requirement is the mechanical technology of downhole tools for orienting the bit at the end of the drill string to drill directionally at some angle away from a straight path.

In recent years, navigation technology and directional drilling technology have been employed in a new type of drilling in which a single drill string may be used in drilling both straight and nonlinear segments of the bore hole without pulling or "tripping" the drill string for replacement of bottom hole assembly components. This new type of drilling, generally called "steerable drilling" or "navigational drilling," employs both a rotatable drill string and a downhole motor (generally a Moineau principle mud motor, although turbines have also been employed) for rotation of the drill bit independently from drill string rotation. Another key component for navigational drilling is a means for orienting or tilting the drill bit at a small angle (typically less than 4°) to the motor and drill string above. Navigational drilling is then effected with such a string by orienting the drill bit and drilling under motor-powered bit rotation alone for drilling a curve, and rotating the drill string in addition to driving the bit with the motor for drilling a straight bore hole. The first patents directed to this technique and various bottom hole assemblies for carrying it out are U.S. Pat. Nos. 4,465,147; 4,485,879 and 4,492,276.

U.S. Pat. No. 4,465,147 (Feenstra et al., 1984) discusses a method and means for controlling the course of a bore hole which uses a downhole motor having an eccentric stabilizer mounted on each end of the housing. This system uses the drill bit attached to the output shaft of the hydraulic motor offset in the bore hole to cant the hydraulic motor off the axis of the main drill string. The axis of rotation of the downhole motor attached to the drill bit and the drill bit itself precesses when the drill string rotates for straight drilling.

U.S. Pat. No. 4,485,879 (Kamp et al., 1984) discusses a method and means for controlling the course of a bore hole which uses a downhole motor having a housing having a preferential tendency to bend in a particular longitudinal plane. As with the '147 patent, the bottom hole assembly of the '879 patent will cause precession of the drill bit, perhaps to a lesser magnitude but with even greater lack of predictability due to the increased preferential bending elasticity of the motor housing.

U.S. Pat. No. 4,492,276 (Kamp, 1985) discloses a downhole drilling motor and method for directional drilling of bore holes which uses a tilted bearing unit to support and incline an output shaft relative to the axis of the motor housing. In this way, the central axis of the output shaft intersects the longitudinal axis of the motor housing rather than coinciding with it.

In addition to the foregoing patents, U.S. Pat. No. 4,667,751 (Geczy et al., 1987) discloses a system and method for controlled rotational drilling which employs a bent housing (tilt unit) attached to a drill string below a downhole motor. Stabilizers are used above and below the bent housing with a stationary drill string to set the direction of the drill bit for drilling a curved hole or a straight hole in the manner previously described. One notable deficiency with this system, as with other navigational drilling bottom hole assemblies, is the drilling of a hole which is oversized from the nominal size of the drill bit when both the hydraulic motor and the drill string are rotated.

U.S. Pat. No. 4,739,842 (Kruger et al., 1988) discusses an apparatus for optional straight or directional drilling of underground formations, which in some embodiments is virtually identical to that of the '751 patent. The '842 patent discusses a downhole motor having an output shaft connected to the drill bit either through a single tilted output shaft, or a shaft assembly having two opposite tilts to minimize the lateral offset of the drill bit from the drill string above. Either concentric or eccentric stabilizers may be employed.

With all navigational drilling bottom hole assemblies, a change in drilling direction and the act of nonlinear drilling itself causes stresses in the bottom hole assembly which are transmitted to the drill bit, causing excessive friction between the drill bit and the wall of the bore hole.

As discussed in the '842 patent, when the drill string is not rotating, the bottom hole assembly with drill bit and stabilizers define points on a curve, the radius of which defines the angle of curvature drilled by the bottom hole assembly in a directional drilling mode. Upon rotation of the drill string, the bottom hole assembly rotates eccentrically in the bore hole. The drill bit, although drilling a hole which is axially aligned with the main drill string, drills an oversized hole. The axis of rotation of the bit rotating on the downhole hydraulic motor precesses around the axis of the straight bore hole.

As noted previously, the basic approach of navigational drilling is to have a drill string comprised of lengths of drill pipe threadedly connected and extending from a drilling rig into the earth formation. The drill string is attached to a rotary table or top drive on the drill rig. In the first case, the drill string itself is keyed to the rotary table so that it can axially move through the rotary table but must rotate with it. If a top drive is used, the drive is lowered as the drill string progresses. As a drill bit attached to the extreme distal end of the drill string cuts its way further into the earth formation, additional drill pipe is attached to the drill string and lowered into the bore or hole.

For purposes of lubrication of parts, sealing the bore, cooling the face of the bit, powering downhole motors, and for carrying away the debris from the earth formation being drilled, drilling mud is pumped down through the drill string. The drill pipe has a sufficient inside diameter for mud flow, discharging the mud through ports in the face of the drill bit crown. Ports in the drill bit face may aim numerous flows of mud toward the cutting elements in the bit crown. Passages for carrying the mud along the face of the bit crown are designed into the bit along with junk slots along the gage of the bit to pass the debris upward into the annulus formed by the drill string and the wall of the well bore. The drill pipe being of smaller diameter than the gage of the drill bit, the annulus formed between the drill string and the bore wall can accommodate the dense mud as it entrains and carries the debris upward to be removed at the surface before the mud is recycled down the well hole.

High pressures are required to pump drilling mud from the surface to the face of a drill bit at the bottom of several thousand feet of mud column. High flows to carry debris and to cool cutters mean extremely high horsepowers at these pressures. Tremendous energy is coursing through the flow of mud. In addition, the hydrostatic pressure at the bottom of the hole is several thousand pounds per square inch.

The high energy content of the high pressure mud flow permits the use of a second prime mover in addition to the engine rotating the drill string from the top of the well. A special hydraulic motor, which may comprise a turbine but which is generally a Moineau-principle type motor, is attached in the drill string to extract energy from the mud flow. The outer casing of the downhole hydraulic motor is engaged to rotate with the drill string while an output shaft extending downwardly from the hydraulic motor turns at some angular velocity with respect to the drill string. Thus, the output shaft from the hydraulic motor rotates at the angular velocity of the output shaft with respect to the drill string plus the angular velocity of the drill string rotating with respect to the earth formation.

The essential concept of navigational drilling employs a mechanism above or usually below the hydraulic motor in the drill string to cant or tilt the drill bit at a slight angle to the well bore axis, normally on the order of a fraction of a degree to four degrees. To drill in a direction away from the current path of the bore hole, the drilling crew rotates the drill string through an arc of less than 360° to orient the drill bit connected to the output shaft of the downhole hydraulic motor. If driven only by the hydraulic motor, the bit points in the desired direction of drilling. In that orientation, the drill string is not rotated; only the output shaft of the hydraulic motor is rotated. As the hydraulic motor output shaft rotates, the drill bit cuts, chips, grinds, or crushes the formation before it to form a bore hole path shaped in a long arc. That is, as the drill bit moves ahead, the canting or tilting mechanism which forces the bit to cut to one side on an angle from the drill string follows the bit into the hole, continuing to force the bit to cut at that same angle. Thus, the drill bit moves ahead in a long arc until the bore is aiming in a desired direction. Having cut a directional hole arcing away from some original path to a new desired orientation, the drill string is rotated as the motor also independently rotates the drill bit. The drill bit then drills straight ahead.

Pulling the drill string out and replacing it, called "round tripping," is an expensive proposition which loses drilling time, and navigational drilling techniques alleviate the need to round trip between straight and curved sections of well bore. Thus, rather than removing the angle drilling equipment from the end of a drill string, a drilling crew simply begins anew to rotate the drill string. As the drill string rotates, its own rotation of the hydraulic motor and tilt unit is superimposed on the rotation of the bit with respect to the hydraulic motor casing and drill string. Thus, the motor-rotated drill bit is moved around the outside perimeter of the hole by the drill string rotation.

Drill bits are designed for drilling a collinear path with respect to an axis of rotation. Particularly, in diamond bits which have polycrystalline diamond compacts as cutting elements attached to a bit face or to studs protruding from the bit face, each cutting element should sweep a specific region in the formation on each rotation of the bit. A drill bit design presumes attachment directly to a coaxially-rotating prime mover. A hydraulic motor at the end of a non-rotating drill string approaches the design conditions, as does bit rotation by drill string rotation, if no tilt mechanism is installed. In these cases, the bit contacts the formation in an orientation for which the bit was designed. Each cutting element sweeps the surface which it is designed to cut, making repeated sweeps at its diametral position. Along its rotating path, it advances at or near its design rate of penetration into the formation.

However, for straight drilling with a navigational drilling bottom hole assembly, the bit crown rotates with the output shaft of the hydraulic motor but the axis of rotation shared by the output shaft and bit crown precesses around the bore hole. Therefore, an individual cutting element on the bit does not continue to rotate at a constant diametral position in the bore. Further, since the bit is canted off the axis of the hole, each cutting element follows a complex, irregular helical path in the formation.

In contrast, a cutting element located on the nose of a bit at the end of a straight hole drill string should cut an annulus in the earth formation at a radius equal to the distance of that cutting element from the axis of rotation of the bit crown. On each rotation, the cutting element should continue in the same annular track seeing over and over that same annulus as it continues to cut into the formation. Likewise, other cutting elements will cut in their own respective, advancing, rotating paths. On the flank or shoulder portion of a bit crown, a cutting element should be working on an advancing, slightly spiraling groove. The radius corresponds to the distance of the cutting element from the axis of rotation. The spiral advances at the rate of penetration of the bit into the formation. Cutting elements on the gage portion of the crown likewise spiral ahead at the gage radius and the rate of penetration of the drill bit.

However, bit damage is excessive during straight drilling with a navigational drilling bottom hole assembly due to the loads experienced by cutters on a precessing, tilted bit. As the bit's axis of rotation sweeps eccentrically around the centerline of the hole, it creates nonuniform, off-design, and impact loading on the cutting elements.

As the entire bit in such situations is rotating rapidly about the drill string axis as well as about a canted axis defined between the motor and the drill bit, virtually all points on the bit actually precess around the centerline of the advancing hole. The hypocycloidal, tilted path thus defined by each precessing cutting element does not cut in an advancing circle in a single plane into the formation, but distorted circles of varying depth around an ever-changing center.

As a result of the precession and the tilt of the bit, the cutting elements are not in continuous contact with the formation so a reduced number of cutting elements can be in contact with the formation at any time. This reduced number of cutters must still support all the loads generated by drilling. Further, the orientation (side rake and backrake) of cutting elements with respect to the formation being drilled varies on a continuous basis, inducing off-design and non-uniform loads. Meanwhile, the angle of the rotating bit with respect to the drill string also rotating results in cutters which alternately move impotently into empty space, revolving back to contact the formation. The result is a shock or impact load on a cutter as it slams back into the formation. Clearly, at any instant of time, certain cutting elements on the bit face are overloaded, while others see virtually no load.

Thus, several adverse effects result from the motion of the individual cutting elements on a bit disposed on a navigational drilling bottom hole assembly that is drilling a straight hole. First, the hole is oversized, reducing efficiency and requiring that a substantial additional volume of the formation be drilled to advance the bore hole. Second, not seeing the same simple circle or spiral path continuously, a given cutting element is exposed to repeated impact as it moves between the empty bore and the bore wall or uncut formation face, or crosses the paths cut by other cutting elements at random. Third, the cutting elements in general are not uniformly loaded as they were designed to be but see higher and more abrupt maximum loads and lower minimum loads so individual cutting elements are more likely to experience catastrophic failure. Fourth, the effective rate of penetration is slowed since numerous cutting elements are not properly loaded continuously, instead alternately having too little and too much formation material to cut. Fifth, the irregular contacts due to the combination of the cutters' irregular paths and the canting of the drill bit to one side of the oversized hole cause bouncing or chattering of the cantilevered drill bit against the formation. Sixth, cutting elements located at certain positions on the bit, such as at the nose or shoulder, will continue to be loaded more often and more heavily than others.

The end result on the drilling assembly is fatigued parts in the drill string, spalling and fracturing of cutting elements, and premature abrasion and erosion of the drill bit. Exaggerated, uneven wear regions appear in addition to damage to overloaded individual cutting elements.

SUMMARY OF THE INVENTION

What is needed to alleviate the above-noted drill bit problems associated with straight hole drilling using a navigational drilling bottom hole assembly is a drill bit which is not restrained to rotate about the axis of rotation of the hydraulic motor output shaft when the shaft is not coaxial with the drill string above. The concept of the present invention is that a drill crown, if provided with a universal joint between itself and the shank of the drill bit attached to the output shaft of the hydraulic motor, is significantly less constrained than prior art bits. The loading on the bit of the present invention by the drill string thus tends to center the bit around the design center of rotation.

Any load imposed on a cutting element in one location on a drill crown as a result of the resistance of the formation to drilling is balanced against the forces acting on other cutting elements in the crown in an optimized bit design. As a result, a well-designed drill bit crown tends to drill straight ahead along its axis of rotation. Thus, if a drill crown were free to orient itself, it would tend to align its face so that the bit would rotate about its true or design axis of rotation. Such a bit would drill along the axis of rotation for which it was designed even though the power to the crown may come through a shaft of a hydraulic motor canted off-axis. That is, the cutters will cut in the direction of resultant loads. The bit will follow the portions of the formation which receive the most contact from cutters. In other words, the bit will self-align in substantially the designed cutting orientation. Further, the stabilizers will tend to maintain a straighter bore as they are drawn down into the relatively smaller diameter bore cut by a swivel crown bit.

Such a self-aligning bit would still drill in the direction of the axis of the output shaft of a downhole motor when the drill string was stationary. Thus, whether the drill string alone turned, or when the downhole motor turned on the end of a turning drill string, the crown of the bit would align itself about the axis of rotation of the drill string.

In addition, variations in formations can affect bit performance. A bit which could self-orient would have improved effectiveness even on a conventional straight drill string. Moreover, a drill string itself may have multiple modes of dynamic oscillations due to loading and rotation. The need for a self-aligning bit extends to straight drill strings to compensate for flexing and bending of the string.

The present invention discloses a tiltable bit crown which allows the crown face to maintain full contact between the formation being drilled and all the cutting elements in all the above circumstances even though attached to a shaft which has been bent, tilted or canted with respect to the axis of the hole, whether accidentally or for directional drilling. The invention allows the crown to coaxially align itself with the axis of the hole, even during straight drilling with a navigational bottom hole assembly, when the motor and tilt mechanism rotate eccentrically between the drill string and the universal of the bit.

The drill crown according to the present invention comprises a shank and crown tiltably associated to permit separate, intersecting, non-collinear axes of rotation. The drill bit disclosed herein provides a crown tiltably connected to the shank of the bit for both straight and directional drilling. Thus, during straight hole drilling, even with the drill string rotation superimposed upon the motor-induced rotation, a well bore of substantially the same diameter as the design gage of the bit results, rather than the oversized bore drilled by prior art bits. In other words, rotation of the bit of the present invention by a hydraulic motor in combination with a rotating drill string results in the same bore size and bit efficiency as the rotation of the bit solely by an hydraulic motor secured to a non-rotating drill string, or to a drill string or motor wherein the drill bit axis remains coaxial with the drill string axis.

Stated another way, the drill bit of the present invention includes a universal or its equivalent connecting the bit crown to the shank for more efficient downhole drilling of earth formations. The drill bit may improve conventional drilling, directional (nagivational) drilling, and straight drilling with directional drilling apparatus. The bit crown according to the present invention comprises a simple load-bearing universal which permits the bit crown to align itself with its own single axis of rotation to optimize the contact between the cutting elements of the bit and the drilled formation. The drill bit disclosed herein, when used for conventional straight drilling, provides more efficient and smoother drilling with reduced bit damage and wear. It also provides all those benefits when used in directional or navigational drilling. The bit further reduces the abuse of the cutting elements which typically arises from straight drilling in association with downhole directional drilling as conducted with a navigational drilling bottom hole assembly.

BRIEF DESCRIPTION OF THE DRAWINGS

FIG. 24 shows an elevation view of a straight bore and a drill string having a single tilt unit (with exaggerated dimensions and angles) and a conventional bit, rather than the swivel-crown bit of the invention.

FIG. 25 shows an elevation view of a drill string having a double tilt unit (with exaggerated dimensions and angles) and a conventional bit as it transitions from straight to directional drilling.

DETAILED DESCRIPTION OF THE PREFERRED EMBODIMENTS

Figure 5:
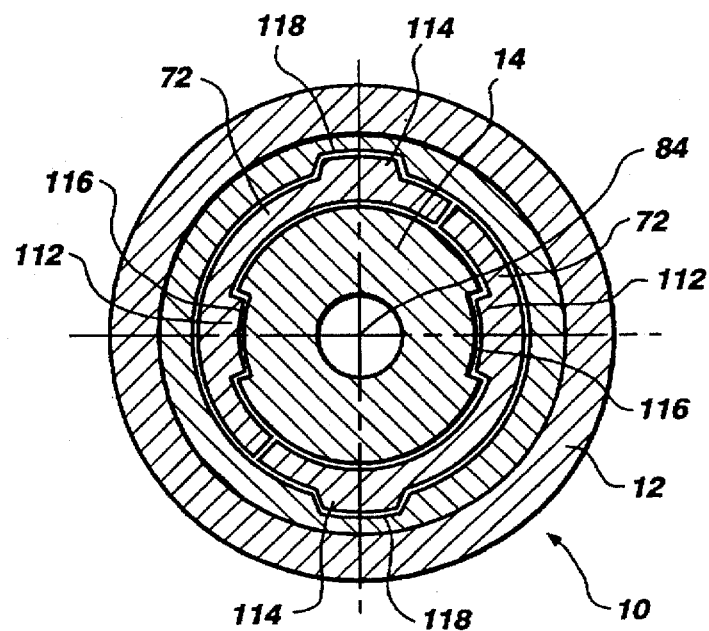
FIG. 5 shows a cutaway plan view of another alternate configuration of the swivel crown bit of FIGS. 1 and 2 taken at section I—I in FIG. 2.
Figure 6:
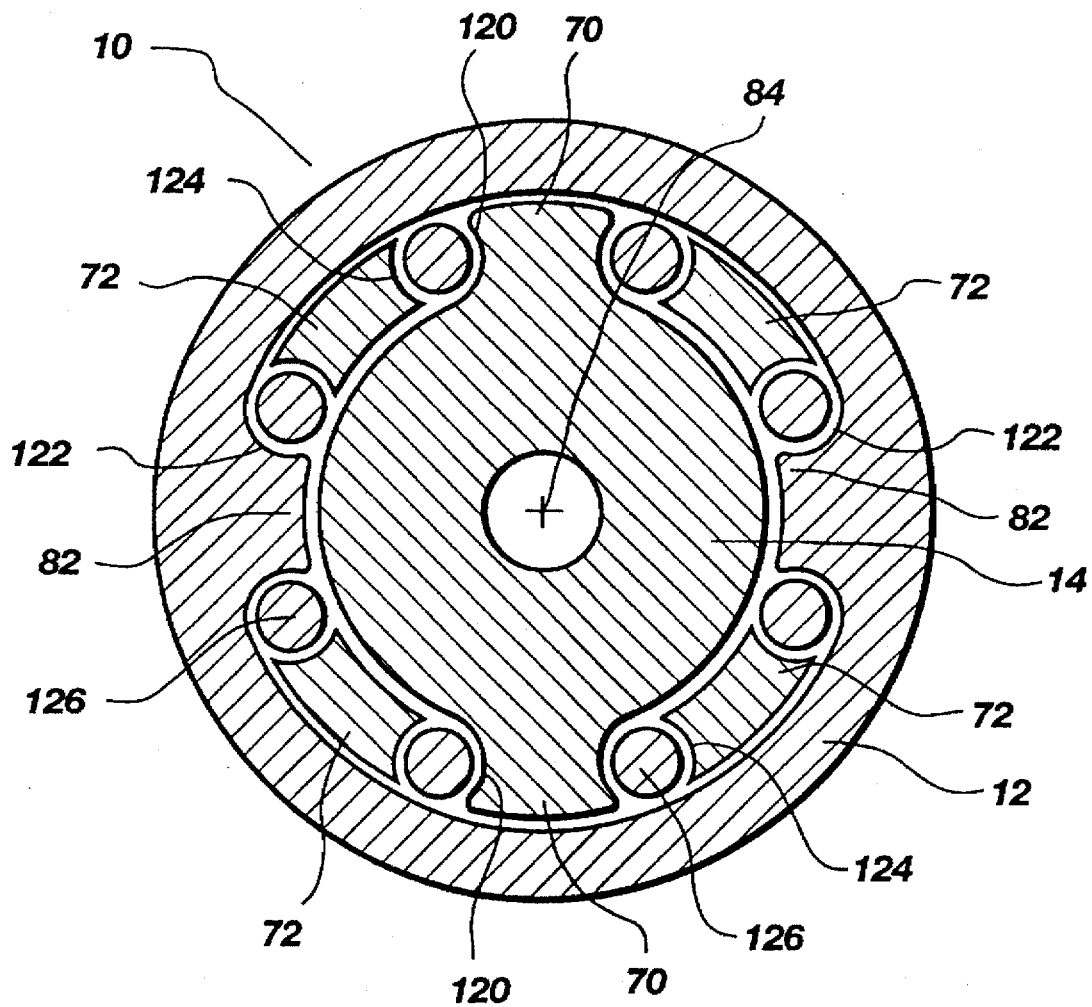
FIG. 6 shows a cutaway plan view of another alternate configuration of the swivel crown bit of FIGS. 1 and 2 taken at section I—I in FIG. 2.
Figure 7:
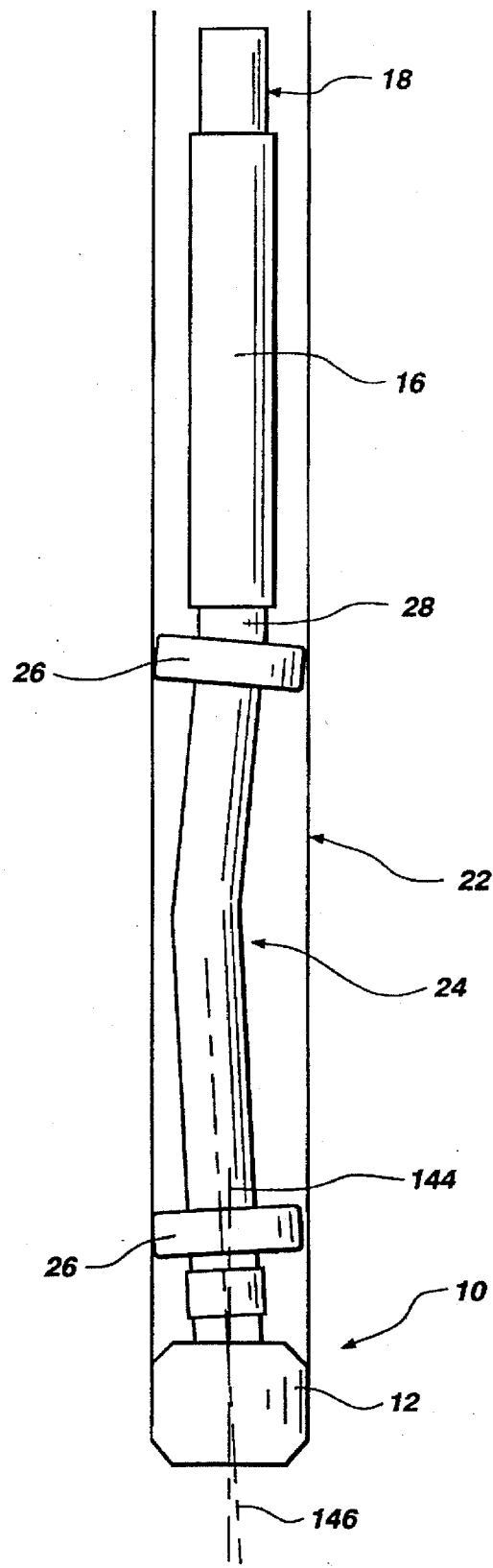
FIG. 7 shows a schematic elevation view of a drill string (with exaggerated dimensions and angles) configured with a tilt mechanism and a swivel crown bit of the invention.

The principles of the present invention can best be seen in FIGS. 1–6, which show one preferred embodiment of the bit 10 with slight variations. Similarly-functioning elements are similarly numbered among the figures. The bit 10 is comprised of crown 12 and shank 14. The shank 14 is connected to crown 12 by one of several means of the present invention designed to give a universal effect to the connection. FIG. 7 shows an elevation view of the bit 10 attached to downhole motor 16 on drill string 18. The universal 20 of FIG. 1 allows the crown 12 of FIG. 7 to align itself in bore 22 despite the angle with respect to the drill string that is imposed by the tilt unit sub 24. Sub is a general term in the drilling industry referring to a component which is assembled within a drill string. Thus, the tilt unit sub 24 of FIG. 7 may be any of several types known in the art. The tilt unit is attached to the outer housing 28 of a downhole motor 16. The outer housing 28 moves with the drill string 21. The drill string 21 is connected to a rotary table and motor drive system or top drive (not shown) at the surface of the earth at the opening of the bore 22.

Referring to FIGS. 1–6, crown 12 has cutting elements 30 (FIG. 2) mounted to its face 32, with gage 36 to align bit 10 in bore 22. From a plenum 38, drilling mud is passed to nozzles 40 which open through the face 32 of crown 12. Column 42 extends from the beginning of the drill string, at the surface of the earth, through the center of the drill string all the way down to shank 14.

Figure 1:
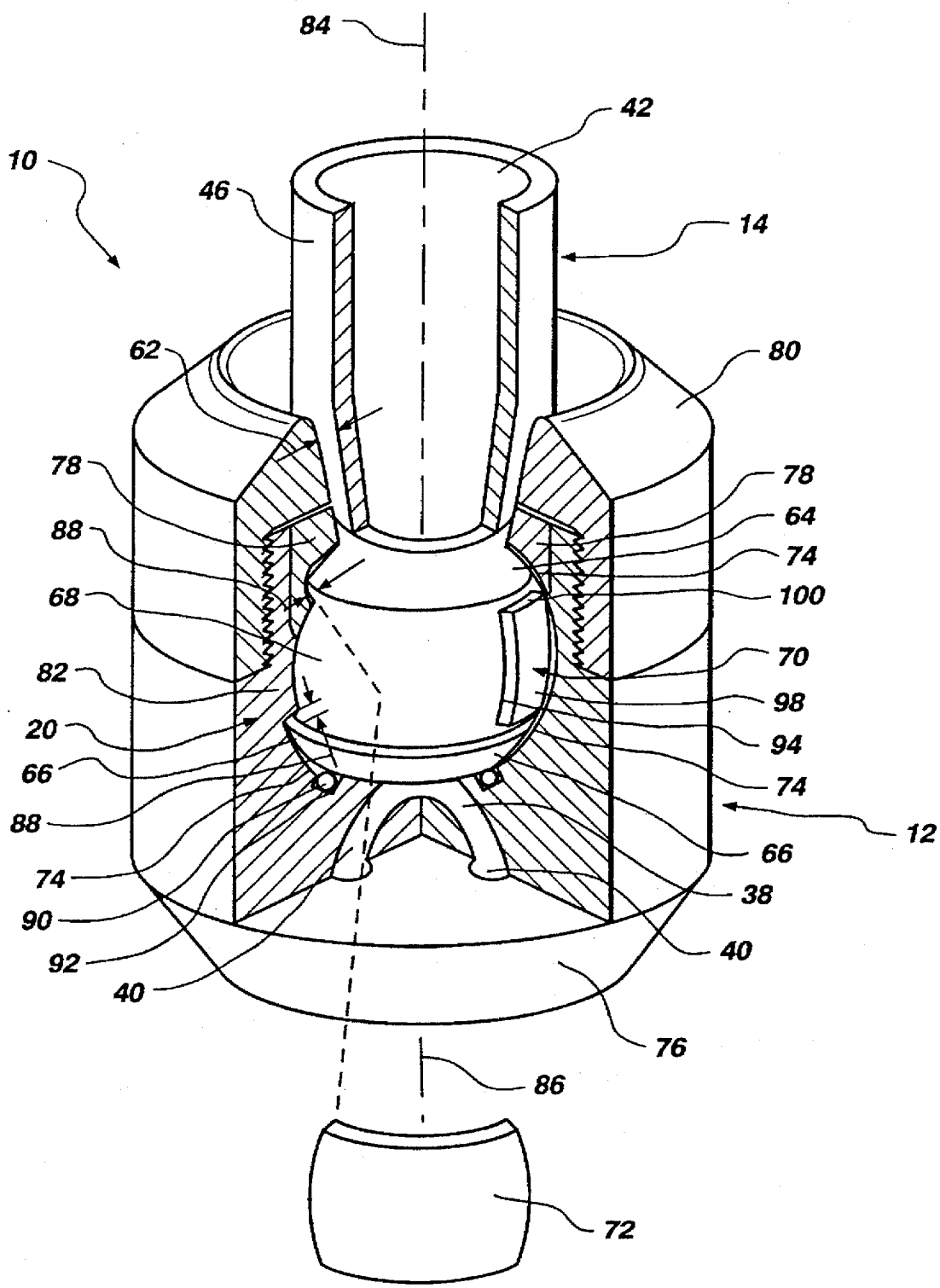
FIG. 1 shows a partial cutaway isometric view of the swivel crown bit having a universal joint.
Figure 2:
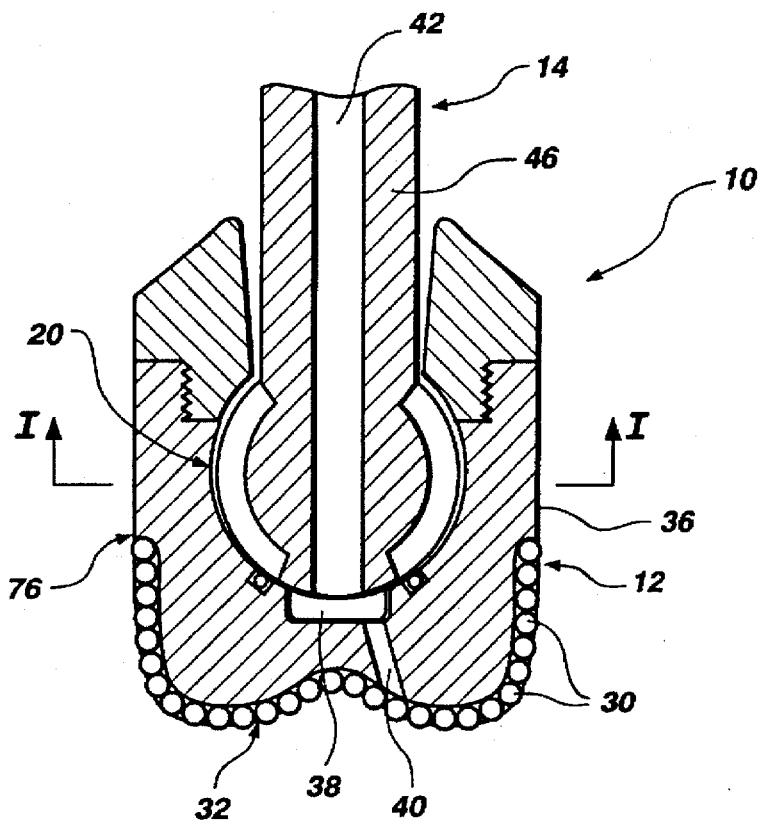
FIG. 2 shows a cutaway elevation view of one embodiment of the swivel crown bit of the invention.
Figure 3:
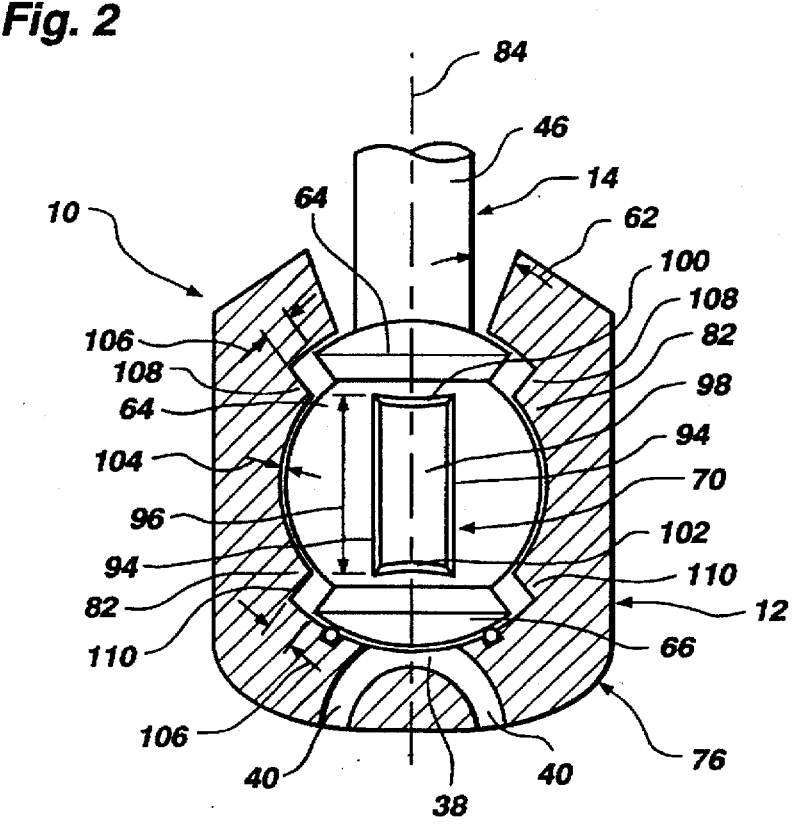
FIG. 3 shows an elevation view of another embodiment of the swivel crown bit of the invention with the crown shown in cutaway.
Figure 4:
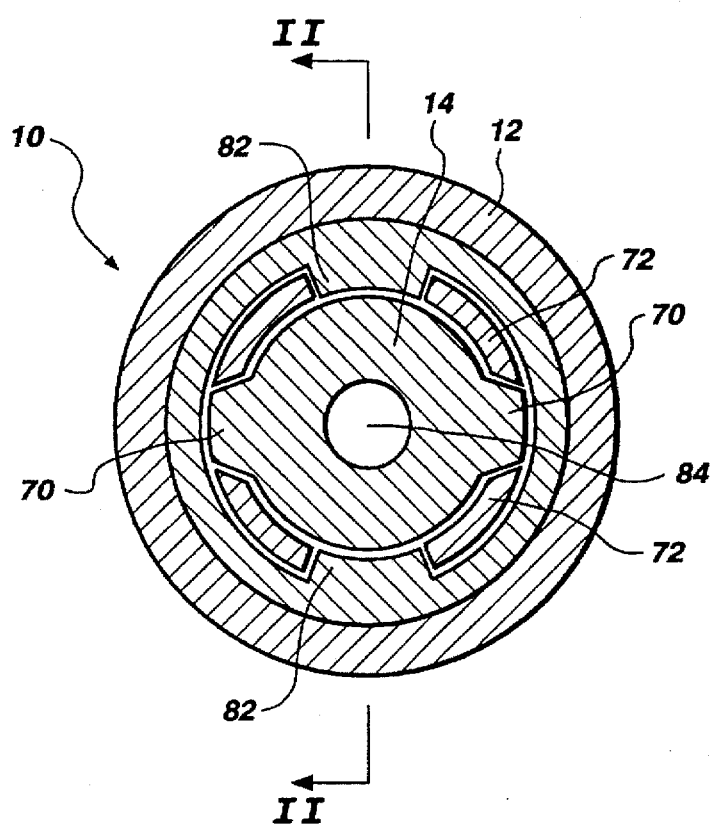
FIG. 4 shows a cutaway plan view of one possible configuration of the swivel crown bit of FIGS. 1–3 taken at section I—I of FIG. 2.

In FIGS. 1 and 2, a universal 20 capable of tilting angular displacements attaches the shank 14 to the crown 12. FIG. 1 is a partial cutaway perspective view of a bit 10 employing the universal 20. FIG. 3 shows a view of crown 12 as viewed along section II—II of FIG. 4 with shank 14 not sectioned. FIGS. 4–6 are alternate embodiments of the bit 10 of FIG. 2 looking along section I—I.

A shank 14 comprises a tubular shaft 46 which attaches to the drill string 18 or the end of an output shaft of a downhole motor. At the distal end of shank 14, a spherical element 64 is attached. Spherical element 64 is provided with an extended surface 66 and excavated surface 68. Protruding outwardly from the excavated surface 68 are shank lands 70, preferably extending to a diameter approximately equal to the diameter of extended surface 66. Shank lands 70 are preferably manufactured by leaving residual material when machining excavated surface 68 below extended surface 66 of spherical element 64, best seen in FIGS. 1 and 3.

Fitting against excavated surface 68 to extend away therefrom to a radius equivalent to that of the extended surface 66 are lugs 72. Column 42 extends through spherical element 64 of shank 14 to provide drilling mud to the crown 12.

Crown 12 is configured to have a spherical surface 74 conformed to extended surface 66 of shank 14. Spherical surface 74 extends into bit body 76 and spherical collar 78, which is retained against bit body 76 by keeper 80.

Crown lands 82 are formed in bit body 76 and, in some configurations, in spherical collar 78. Crown lands 82 protrude from the crown 12 toward excavated surface 68 of shank 14. Thus, crown lands 82 would almost completely interfere with shank lands 70 if not for circumferential offset. Crown lands 82 are circumferentially 90 degrees out of phase from shank lands 70 about shank axis 84.

The intervening space between shank lands 70 and crown lands 82 is circumferentially occupied by lugs 72, which are captured radially between excavated surface 68 of shank 14 and spherical surface 74 of bit body 76. Thus, lugs 72 force crown lands 82 to rotate with shank lands 70 about shank axis 84 while allowing crown axis 86 to tilt away from shank axis 84.

Tilt clearance 88 is required above and below crown lands 82. Tilt clearance 88 must be sufficient for the full clearance angle 62 between shank 14 and crown 12. That is, in operation, crown lands 82 will oscillate within the region of excavated surface 68 between extended surface 66 above and below crown lands 82. Shank lands 70, on the other hand, can be continuous with extended surface 66 of shank 14, all moving within the spherical surface 74 of crown 12.

The crown 12, shank 14, or both must typically contain some means to seal against the other, to direct pressurized drilling mud to the face of the crown 12 for cooling and cleaning the cutting elements and removing cut formation debris. In the embodiment of FIG. 1, seal 90 fits into a seal groove 92 cut into spherical surface 74 in crown 12. Seal 90 extends above seal groove 92 to contact extended surface 66 and shank 14 to make a seal. Seal 90 assures that drilling mud conducted through column 42 from drill string 18 into shank 14 passes onto plenum 38 and nozzles 40 in the face of bit body 76 of crown 12. Nozzles 40 feed drilling mud to cutting elements 30 to carry away debris, to cool the cutting elements 30, and to lubricate the contact between the bit and the formation. Seal 90 provides a pressure seal to substantially prevent the mud from escaping back through the universal 20. The seal 90 also prevents erosion of the components of the universal 20.

As shown in FIGS. 1 and 3, shank land 70 has shank land sides 94 which must progress around spherical element 64 with planar symmetry around a plane through shank axis 84 and the "vertical" center of shank land 70. Thus, although shank land sides 94 can be configured to form a trapezoidal cross-section in shank land 70, each point on a shank land side 94 must move in the same plane defined by the movement of shank axis 84 and parallel to the "vertical" centerline of the shank land 70. Otherwise, shank 14 would be rigidly fixed with respect to crown 12. Since the outer surface 98 of shank land 70 is substantially coincident with the extended surface 66 of spherical element 64, clearance above nominal is not necessary between shank land 70 and extended surface 66 at upper and lower ends 100, 102 of shank land 70. Depending on manufacturing, shank land 70 may be contiguous with extended surface 66, within the constraints mentioned above.

Crown lands 82 extend inwardly as part of crown 12, barely maintaining a clearance 104 with excavated surface 68. In addition, an angular clearance 106 exists between spherical element 64 and upper and lower ends 108, 110 of crown lands 82. Angular clearance 106 provides the necessary freedom of relative rotation between shank 14 and crown 12. The shank and crown at the location of clearance 106 also serve as a limiting means whenever upper and lower ends 108, 110 of crown lands 82 contact spherical element 64.

Shank lands 70 and crown lands 82 extend into both the upper and lower hemispheres of spherical element 64. Assembly may be simpler if crown lands 82 and shank lands 70 are formed only in the lower hemisphere of spherical element 64. In that case, the spherical collar 78 need not accommodate shank lands 70. It may act as a stop mechanism for crown lands 82 and accommodate only the simple spherical shape of extended surface 66 of spherical element 64.

Spherical surfaces within the lower hemisphere of spherical element 64 must be load-bearing and must accommodate relative rotation between shank 14 and crown 12. Since the relative rotation (tilting, swiveling) between crown 12 and shank 14 is limited to less than a few degrees, tilt or swivel is a more appropriate term perhaps.

In the embodiment in FIG. 5, lug inner land 112 serves the function of shank land 70 of the embodiment of FIG. 4. Lug outer land 114 serves the function of crown land 82 of FIG. 4. The same kinds of geometrical and load requirements exist in each case. One advantage to the configuration of lug 72 in FIG. 5 is that lug 72 may be made of a tougher material or softer material than either shank 14 or crown 12. Thus, the lugs 72 would absorb shock, although such a material might have poorer wear characteristics. However, lug 72 becomes a completely replaceable part for improved wear characteristics of the remainder of the bit 10. A casting process to produce the hemispherical lugs 72 could male reproducible, accurate, and inexpensive replacement parts for long operation of bit 10. Note that the lugs 72 in all configurations carry rotary power to the drill bit and also carry axial compressive forces to maintain the rate of penetration of bit 10.

Lug inner and outer lands 112, 114 rotate within shank slots 116 and crown slots 118, respectively. Each configuration must gimbal the crown 12 in two degrees of freedom with respect to the shank 14.

In the embodiment of FIG. 6, bit 10 is provided with shank races 120, crown races 122, and lug races 124 in shank lands 70, crown lands 82, and lugs 72, respectively. The planar symmetry of shank land 70 and crown land 82 is still required as discussed above. Nevertheless, bearings 126 are captured by shank races 120, crown races 122, and lug races 124 to provide frictionless tilting of crown 12 with respect to shank 14.

Although shown here as spherical bearings, bearings 126 could be rollers with shank, crown and lug races 120, 122, 124, respectively, shaped accordingly to have flat, curved or circular surfaces to allow bearings 126 to roll axially with respect to shank axis 84. The configuration of FIG. 6 has several moving parts, but lugs 72 and bearings 126 could be easily replaceable elements made of a softer or otherwise less durable material than shank lands 70 and crown lands 82.

Figure 14:
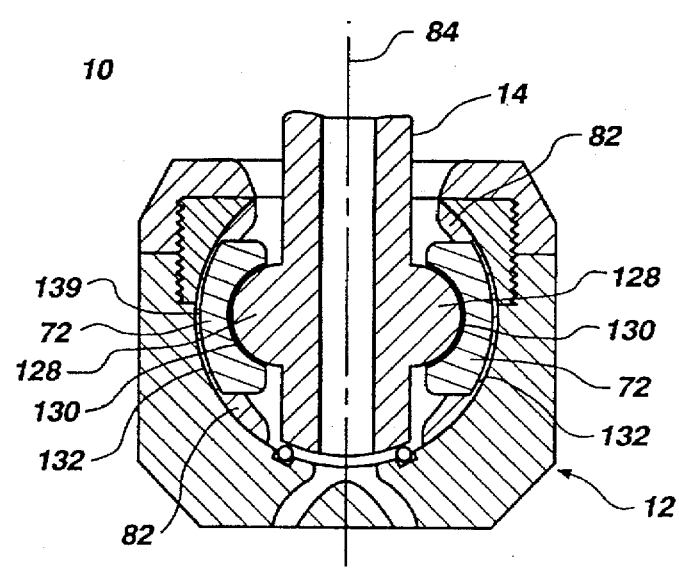
FIG. 14 shows a cutaway elevation view of an alternate embodiment of the swivel crown bit of the invention.

FIGS. 14–22 show alternate embodiments for the universal 120 of the bit 10. In FIG. 14, the shank 14 contains four balls, trunnions 128, either integral or securely attached thereto. Trunnions 128 positioned every 90 degrees about shank axis 84 are fitted into sockets 130 formed in lugs 72. Lugs 72 move in spherical ways 132 in crown 12. The view of the bit 10 of FIG. 14 may be identical from a position rotated 90 degrees from the view shown. Thus, bit 10 has a true universal.

Crown lands 82 are basically the continuation of the material of crown 12 between lugs 72. This configuration provides for tilting of shank 14 into or out of the plane of the page about trunnions 128 in sockets 130. Thus, all lugs 72 are restrained to move between the crown lands 82 of crown 12. The additional degree of freedom provided by trunnions 128 in sockets 130 allows the necessary movement in orthogonal planes to give the universal effect.

Figure 15:
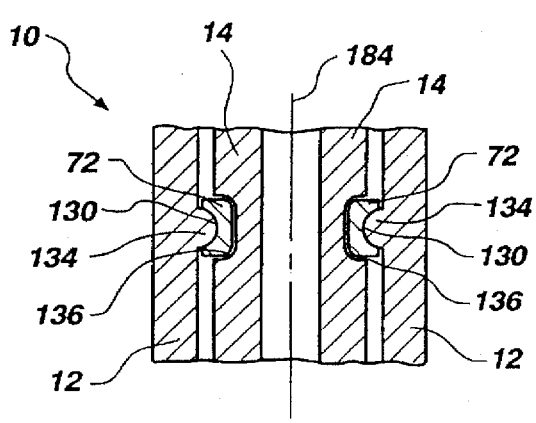
FIG. 15 shows a cutaway elevation view of a segment of an alternate embodiment of the universal of the swivel crown bit of the invention.

In FIG. 15, trunnions 134 formed as part of crown 12 fit into sockets 130 in lugs 72 which slide in ways 136 formed in shank 14. This configuration has certain inaccuracies since ways 136 are parallel, not circular. Lugs 72 will, therefore, not have a constant tolerance in ways 136 upon tilting of crown 12. Thus, the concept of FIG. 15 is not a true universal joint, but for the small angles required is a legitimate configuration.

Figure 16:
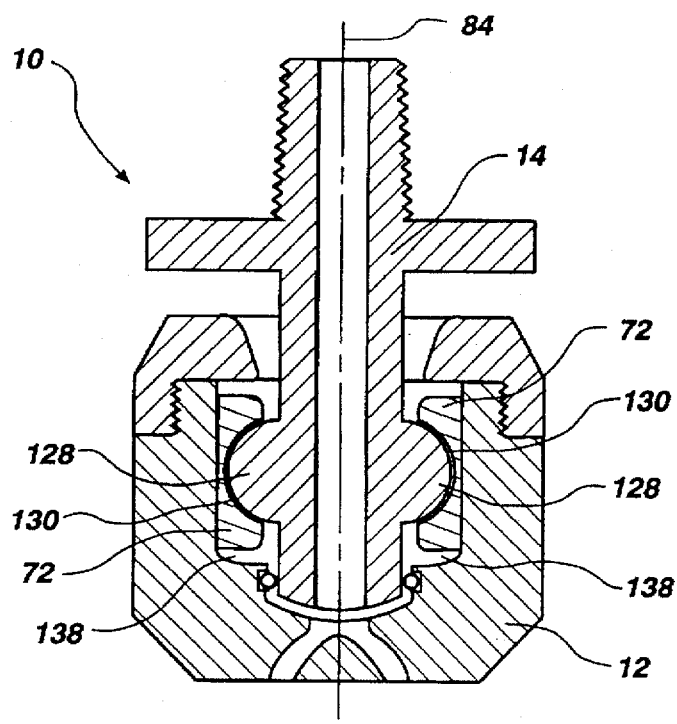
FIG. 16 shows a cutaway elevation view of an alternate embodiment of the swivel crown bit of the invention.
Figure 17:
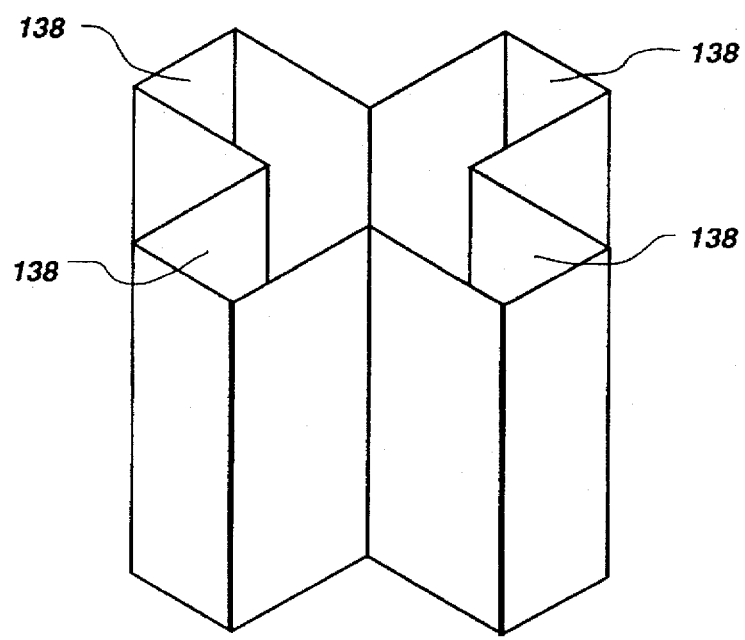
FIG. 17 shows an isometric view of a rectangular configuration of the ways in which the lugs of FIG. 16 travel.

Similarly, FIG. 16 further illustrates the concept of FIGS. 14 and 15. That is, trunnions 128 attached to shank 14 ride in sockets 130 formed in lugs 72 which slide in ways 138 formed in crown 12. Since ways 138 are parallel to one another rather than being spherical like the spherical ways 132 in FIG. 14, the perpendicular distance with respect to ways 132 between lugs 72 on opposing sides of crown 12 varies slightly with the tilting of shank axis 84 with respect to crown 12. Thus, FIG. 16 is not a true universal, but for small angles operates effectively as one. The major movements required of a universal can be accomplished with the configuration of FIG. 16. FIG. 17 shows the geometrical relationship of ways 138 in the bit 10 of FIG. 16.

Figure 18A:
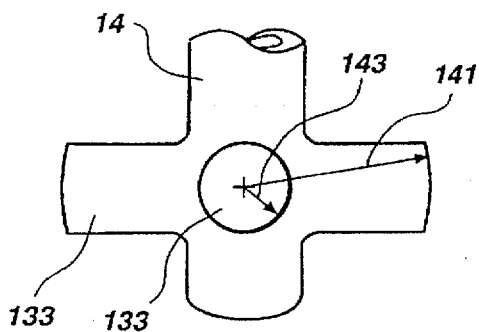
FIGS. 18A, 18B and 18C show alternate embodiments of trunnions which can operate in the ways of FIG. 17 without lugs.
Figure 18B:
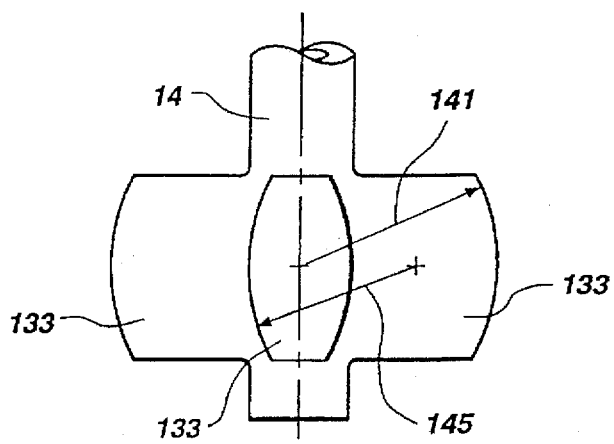
Figure 18C:
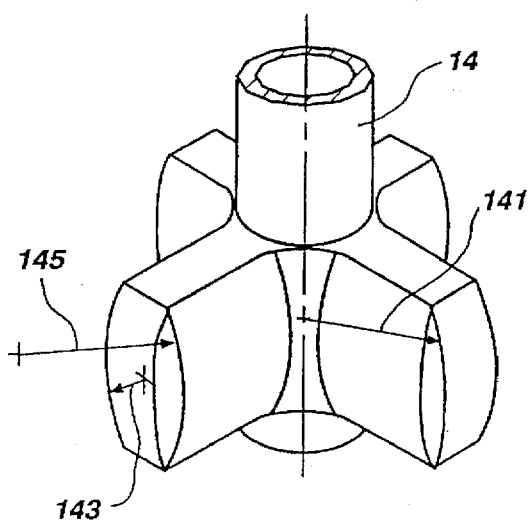
Figure 19A:
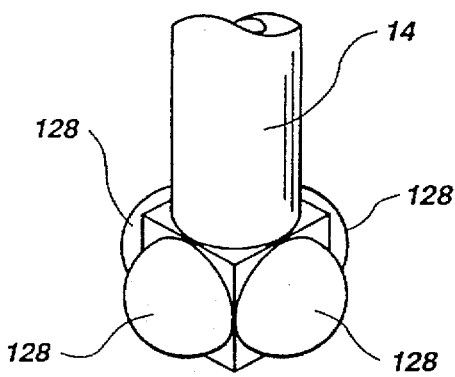
FIG. 19A shows an isometric view of one configuration for spherical trunnions formed on the shank of the bit of FIGS. 14 and 16.
Figure 19B:
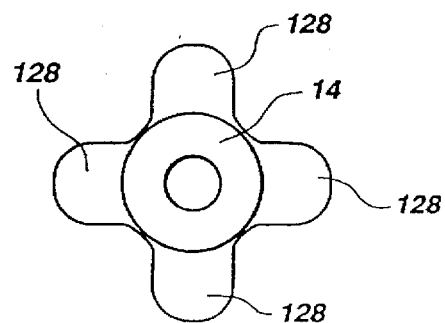
FIG. 19B shows a plan view of a configuration for the spherical trunnions formed on the shank of the bit of FIGS. 14 and 16.

The simplest shanks 14 for moving in the ways 138 of FIG. 17 are shown in FIGS. 18A–C. The shank 14 is provided with rockers 133 to replace the trunnions 128 and the lugs 72 which move in ways 138 configured as in FIG. 17. By proper choice of a radius 141, the rockers 133 could move in the ways 138 to produce a universal effect while maintaining the shank 14 centered in the crown 12 of the bit 10. Likewise, a proper radius 143 or 145 on each rocker 133 assures proper load-bearing capacity in the shank 14 for driving the crown 12. FIGS. 19A and 19B show a perspective view of trunnions 128 in possible configurations of shank 14. The trunnions 128 may be integrally formed on the shank 14 and filleted.

Figure 20:
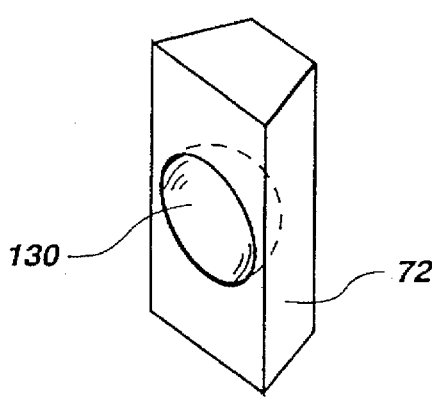
FIGS. 20–21 show isometric views of alternate trapezoidal and rectangular embodiments, respectively, for the legs in the swivel crown bits of FIGS. 15–16.
Figure 21:
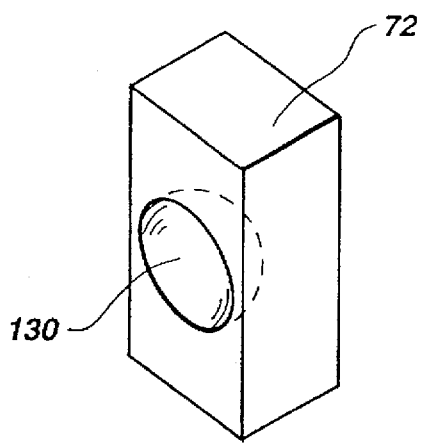
Figure 22A:
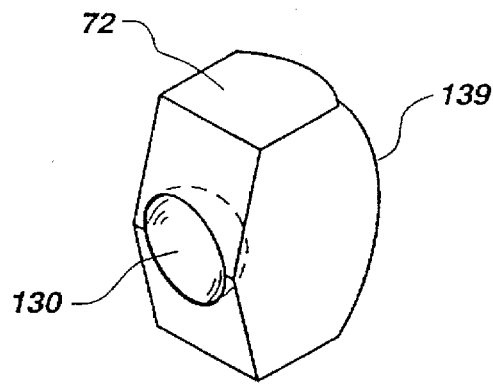
FIGS. 22A and 22B show isometric views of alternate embodiments of lugs for the swivel crown bit of FIG. 14, having spherical and cylindrical surfaces, respectively.
Figure 22B:
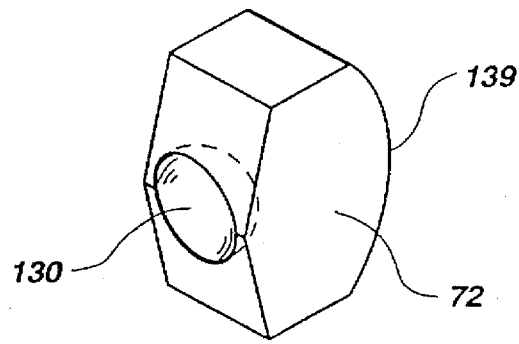
Figure 22C:
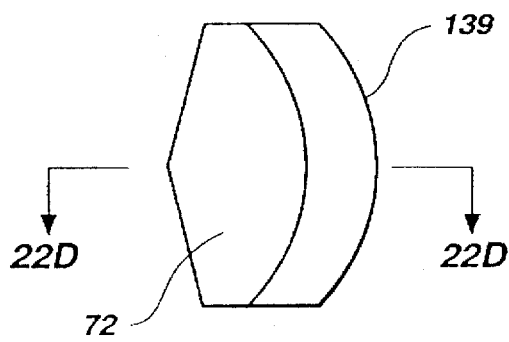
FIGS. 22C and 22D show an elevation view and section view, respectively, of an alternate embodiment of the lug of FIG. 22B.
Figure 22D:
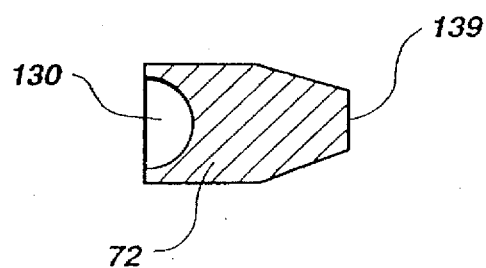

FIGS. 20 and 21 show possible configurations of lugs 72 for the configuration of FIGS. 15 and 16, while FIGS. 22A–D show lugs 72 to fit the curved surface 139 of FIG. 14, which is preferably spherical (FIG. 22A), but maybe cylindrical (FIG. 22B) and may include a trapezoidal cross-section (FIGS. 22C–D). Cylindrical surfaces may replace spherical ways 132. That is, spherical ways 132 may generally be replaced by circular slots having trapezoidal or rectangular cross-sections in which lugs 72 slide in circular arcs.

FIGS. 8–13 show another embodiment of the invention to achieve a universal effect. Flexible sub 44 is made of a continuous but flexible material to operate as the universal. Such a device relies on the elastic deflection of reduced sections of material to accommodate the tilting movement of the crown, usually less than one degree, but sometimes as much as four degrees. Flexible sub 44 can be thought of as a special kind of shank 14 having a shaft 46 cut at its outermost diameter with flex slots 48 extending to a depth 50 sufficient to render the flex sub 44 more easily bendable. The flex slots 48 are preferably provided with anvils or stops 52 mounted on either side of flex slots 48 to limit the bending of flexible sub 44 at any given flex slot 48. The anvils or stops 52 may be made of the same material or a material substantially harder or tougher than the material of shaft 46 in which flex slots 48 are formed. Different sizes of stops 52 may be used to adjust the clearance 49 between the stops and to increase or decrease effective flexibility of the flexible sub 44. Flexible sub 44 is typically a steel part, while anvils or stops 52 might be a hardened steel or a tungsten carbide alloy.

The design of flex slots 48 might be narrow or broad. Similarly, flex slots 48 could be relatively straight as in FIGS. 9 and 10, having a radius of curvature 54 to distribute stress and prevent stress concentrations during bending. Alternatively, as in FIG. 11, flex slot 48 can be a transverse cylindrical bore cut through at one side to the outside surface 56 of flex sub 44. The configuration of flex slots 48 used should balance maximum distribution of bending stresses over a large radius, against a radius small enough to allow the maximum number of flex slots 48 to be cut into flex sub 44. Anvils or stops 52 can be placed outside of a flex slot 48 or inside.

Figure 8:
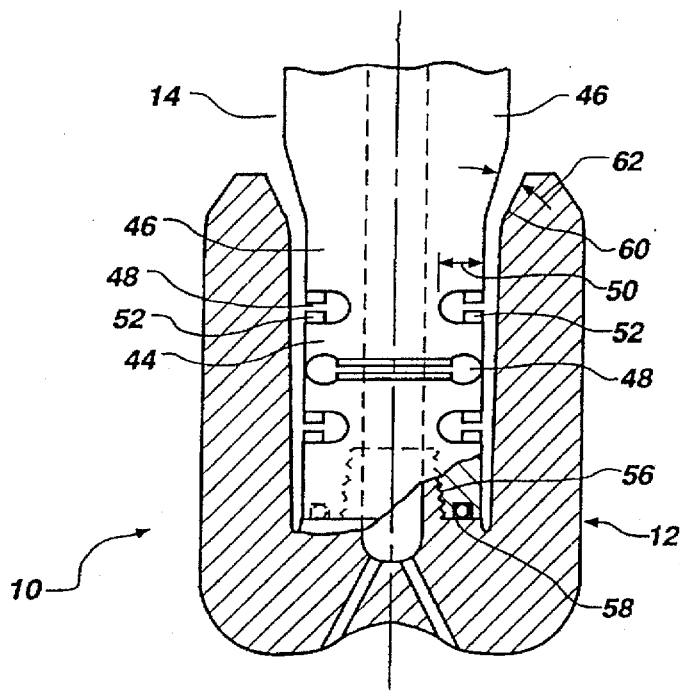
FIG. 8 shows a partially cutaway elevation view of a flexible sub configuration of the invention.
Figure 9:
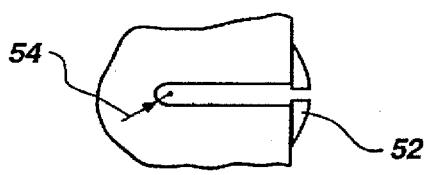
FIGS. 9–11 show an elevation view of various configurations of flex slots in the flexible sub of FIG. 8.
Figure 10:
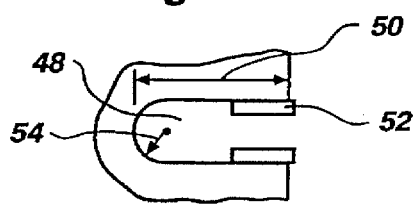
Figure 11:
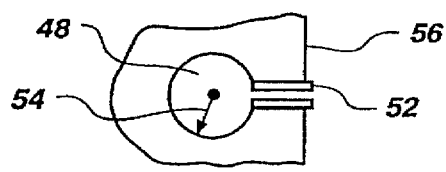

The flex slots 48 may be arranged as in FIG. 8 on opposite sides of flexible sub 44, with alternating pairs of flex slots 48 being orientated at a 90° angle with respect to each other. The flex slots 48 might be staggered as in FIG. 12A rather than being directly opposite one another. In this way, greater torsional loads could be carried in the flexible sub 44 since the cross-section normal to the axial direction is not as thin as in the configuration of FIG. 4.

Figure 12A:
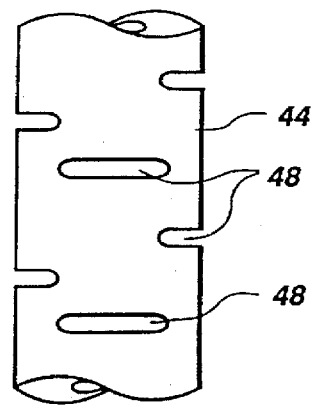
FIGS. 12A and 12B show an elevation view of a portion of the flexible sub of FIG. 8 with alternate configurations for the flex slots.
Figure 12B:
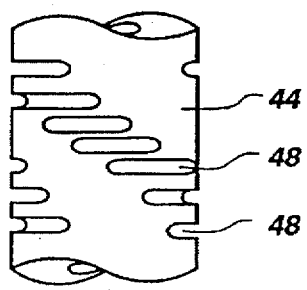
Figure 13:
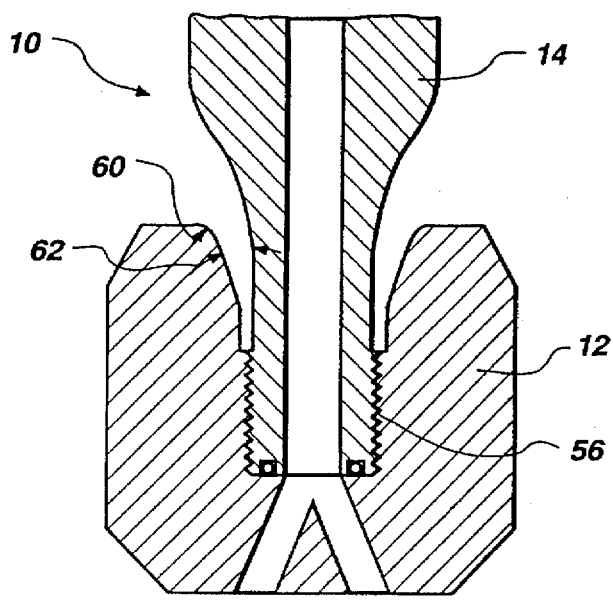
FIG. 13 shows a cutaway elevation view of a flexible sub having a shank of reduced cross section for inducing flexure above the crown of the bit.

Conceivably, flex slots 48 might be staggered even further as shown in FIG. 12B. This configuration can allow tremendous torques to be passed down the solid portions of flexible sub 44 while allowing substantial bending at the flex slots 48. Nevertheless, the preferred embodiment at present is for slots as configured in FIG. 8.

Flexible sub 44 is secured to crown 12. The preferable attachment means is a threaded connection 57 in which flexible sub 44 is threadedly engaged until it comes to rest against a stop 58 on the crown 12.

Some configurations could cause more even loading and deflection. Each configuration can be made sufficiently strong in torsion while still bending adequately. One advantage of symmetry, however, is smoother operation.

In the embodiments of FIGS. 1–6, shank 14 and crown 12 are configured to form a true universal joint which may be designed to permit a relatively large angle of tilt. The flexible sub of FIG. 8, in contrast, is functional because only a small angle of tilt is required in most applications. The flexible sub 44 basically comprises a shaft 46 made discontinuous or otherwise of reduced section at its outermost fiber to improve its flexibility in bending.

Because it will bend with respect to the crown 12, flexible sub 44 may be provided with either a relief radius 60 or a clearance angle 62 or both. The crown 12 may also serve as a stop to prevent excessive tilting with respect to shank 14.

Figure 23:
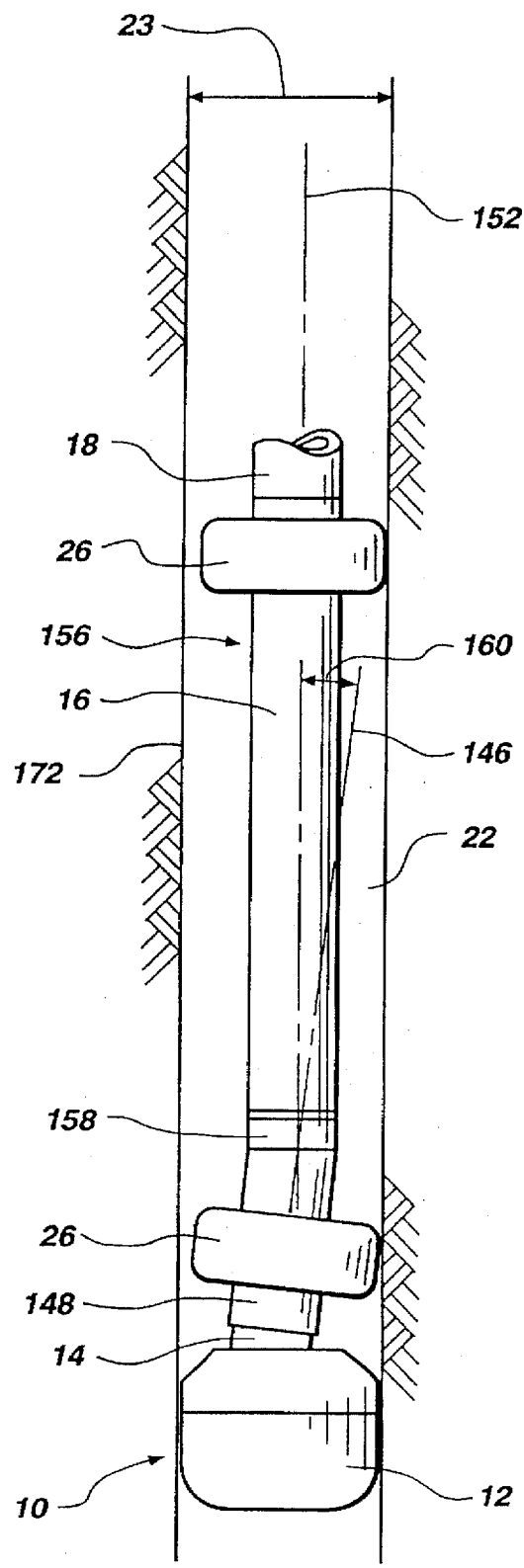
FIG. 23 shows an elevation view of a drill string configured with a single tilt unit (with exaggerated dimensions and angles) and the swivel-crown bit of the invention for straight or directional drilling.

The three operational scenarios of interest are understood by reference to FIGS. 23–25. It should be understood that angles and sizes are necessarily exaggerated for clarity in FIGS. 23–25. The scenarios include straight drilling on a conventional drill string, straight drilling on a directional or navigational bottom hole assembly at the end of a rotating drill string and directional or navigational drilling with a bottom hole assembly at the end of a non-rotating drill string.

In the first instance (not illustrated), conventional straight drilling benefits from the apparatus of the invention by improved efficiency. Less material must be drilled because the orientation of the bit 10 is unaffected by any wobbling or bending of the highly-loaded drill string. Increased efficiency improves the rate of penetration as well as the wear characteristics and breakage rates of the bit 10.

In the second instance, a conventional drill bit secured to the output shaft 148 of motor 16 of the bottom hole assembly for navigational drilling maintains a slight angle of tilt with respect to drill string 18. The drill string 18 can be selectively rotated to control the effect of the bottom hole assembly. If the drill string 18 is stationary, the effect is directional drilling. If drill string 18 rotates, then bit 10 precesses around bore 22 defined by bore axis 144 as described in the background (see FIG. 27). By contrast (FIG. 23), if bit 10 of the type of the present invention is employed, then both drill string 18 and output shaft 148 of downhole motor 16 may rotate but bit 10 will align itself with the smallest possible bore 22 to balance the forces on it. Efficiency and rate of penetration improve. Wear and breakage rates are likewise improved dramatically by the properly-oriented and loaded bit 10.

In the third instance (FIG. 25), drill string 18 is not rotating. Output shaft 148 is rotating, so bit 10 has only one axis of rotation, the motor axis 146. In that case, bit 10 of the invention will align itself with motor axis 146 and drill a directional bore. The benefits correspond to straight drilling of the first instance above.

FIG. 23 shows bore 22 with a navigational drilling system having stabilizers 26 mounted to single tilt unit 156 and downhole motor 16, a bottom hole assembly generally as disclosed in U.S. Pat. No. 4,667,751. Single tilt unit 156 has a single bend 158 to cant the output shaft of downhole motor 16 with respect to drill string 18. Output shaft 148 is oriented such that rotation of output shaft 148 with concurrent rotation of drill string 18 will cause stabilizers 26 to rotate inside bore 22 while output shaft 148 also rotates with respect to drill string 18. The effect on crown 12 of bit 10 is to swivel about shank 14, aligning itself with drill string 18. Bit 10 then drills a straight hole of substantially the design gage of bit 10 to the extent possible. For a bend 158 having a small tilt angle 160, a very satisfactory alignment of crown 12 may be made with respect to drill string axis 152.

Without the swivel-crown bit of the instant invention, FIG. 24 would describe the motion of a bit 10 in a bore 22. Single tilt unit 156 having bend 158 to tilt downhole motor 16 with respect to drill string 18 aligns the output shaft 148 of downhole motor 16, thus assuring that bit 10 will precess around bore 22 along cutting surface 164. Diameter 23 of bore 22 is measurably larger than crown 12. Further, crown 12 is not aligned with cutting surface 164, so it tends to bounce and chatter against bore wall 172, increasing bit wear.

FIG. 25 shows a bottom hole assembly with a double tilt unit 166 having upper bend 168 and lower bend 170, which together tilt drill bit 10 with respect to downhole motor 16 and drilling string 18. Stabilizers 26 prevent double tilt unit 166 from rubbing the bore wall 172 of bore 22. This bottom hole assembly is similar to one of the embodiments of U.S. Pat. No. 4,739,842. For directional drilling, crown 12 of bit 10 rotates about output shaft 48 with a non-rotating drill string 18. Stabilizer 26 will follow crown 12 into directional bore 174, which has a directional bore diameter 176 cut out to fit crown 12. If bit 10 is a conventional bit, as in FIGS. 24 and 25, then bore diameter 23 is larger than crown 12 and stabilizers 26 in the straight portion of bore 22. In the directional bore 174, directional bore 176 generally corresponds to the diameter of crown 12, but may still be slightly oversize or out of round.

If instead the bit 10 of the instant invention is used, as shown in FIG. 23, then bore diameter 23 remains the size of crown 12 during both straight and directional drilling. If downhole motor 16 is the only motive means rotating shank 14, the bore 22 is directional and fits crown 12. If drill string 18 is rotating and output shaft 148 is rotating with respect to drill string 18 in addition, crown 12 aligns with the drill string 18. The bend of the single unit 156 or dog leg of double tilt unit 166 rotates between crown 12 and drill string 18 like a jump rope.

One beneficial result of the use of the instant invention in straight hole drilling is that less volume of a formation needs to be drilled. Straight hole drilling is the majority of any bore 22 of a well in an earth formation, so the benefits can be substantial.

Figure 26:
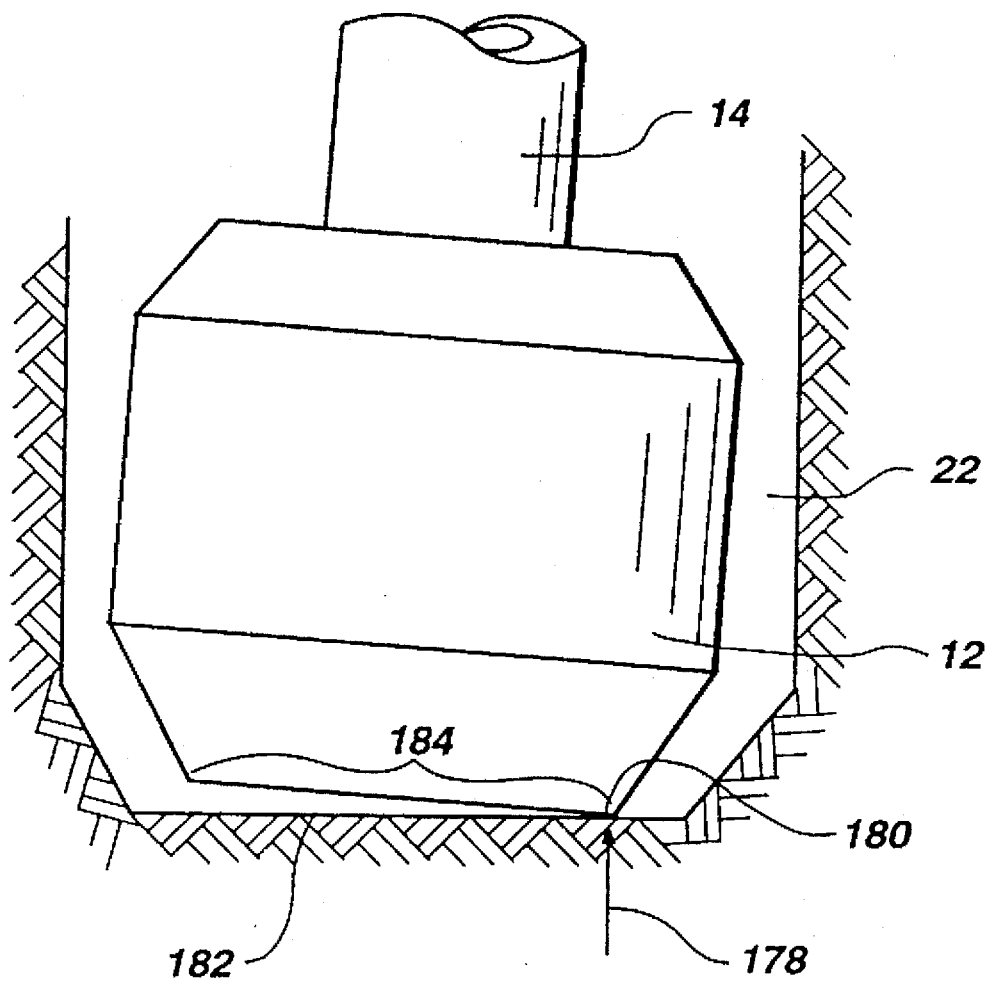
FIG. 26 shows an elevation view of a canted bit on which the face and gage are not aligned with the working surface of the oversized bore.

As shown in FIG. 26, a crown 12 which is not in contact with a formation may have space to wobble within bore 22, and forces 178 concentrated at the point or line of contact 180 of crown 12 must support a load in excess of the designed capacity. If instead shank 14 tilts with respect to crown 12, then a force 178 acting on only one side of crown 12 will tend to align crown 12 with the face 182 of the formation so that the forces 178 are distributed over the bit face 184. Thus, the universal 20 of the instant invention promotes less cutter wear, less cutter breakage, higher efficiencies, higher rates of penetration and smaller bore diameters 23, optimizing the use of a crown 12 of a bit 10 in both directional and straight drilling.

Specific directional drilling apparatus have been discussed in order to illustrate the invention. However, the self-aligning crown 12 achieved by the invention and the universal 20 which provides such features are equally applicable to most drilling configurations. Drilling performance of conventional directional drilling downhole assemblies (including kick-off assemblies) can be improved by the invention. Whether fixed in place on a drill string or selectively actuated from the surface while in service, directional tilting mechanisms will benefit from the bit 10 of the invention. As discussed, benefits accrue to a drilling rig using the bit 10 in virtually all conventional drill string configurations.

Likewise, the invention is described and illustrated with a crown 12 of the type known as a "drag bit" or "fixed cutter." The cutting elements 30 are fixed with respect to the crown 12. The cutting elements 30 are thus dragged along against the formation at the same rate of rotation as that of the crown. Nevertheless, the crown could be configured on its outer surfaces to have what is called a "tri-cone" or "rock bit" configuration. In that configuration, well known in the art, multiple roller cones mounted in a recess in the crown 12 rotate while carrying "teeth" distributed around the exteriors of the cones. The "teeth," called cutting elements also, cut into a rock formation with a compound rotary motion, since the roller cones rotate with respect to the crown 14 and the crown rotates with respect to the formation. The instant invention, by allowing self-alignment of the crown 12, equalizes the loads on the teeth and bearings of the roller cones. Thus, reduced tooth and bearing failures result from the load-balancing effect of the self-alignment provided by the invention.

The features of the embodiments illustrated and described herein can be combined to form other configurations by one having ordinary skill in the art. Without limiting the scope of the claimed invention to the disclosed embodiments, the invention disclosed herein is limited only by the claims.

What is claimed is:

1. A drill bit assembly for drilling a borehole in subterranean formations, comprising:
    a shank for attaching said drillbit assembly to a drill string;
    a crown having an exterior including a face extending radially outwardly from a center to a gage, said gage defining the diameter of said borehole;
    a plurality of cutting elements carried on said face of said crown, said cutting elements being disposed over said face to said gage; and
    a tilting assembly between said shank and said crown, said tilting assembly permitting tilting of said crown with respect to said shank while transmitting torque and axial loads from said drill string through said shank and to said crown.

2. The bit of claim 1, wherein said shank and a portion of said tilting assembly are integral.

3. The bit of claim 2, wherein said shank and said tilting assembly portion are comprised of a continuous piece of material.

4. The bit of claim 1 further comprising at least one seal positioned intermediate said shank and said crown for preventing leakage of drilling fluid conducted via a first passage through said shank to a second passage through said crown.

5. The bit of claim 1, wherein said tilting assembly comprises a universal joint.

6. The bit of claim 5, further comprising a seal positioned intermediate said shank and said crown for preventing leakage of drilling fluid conducted via a first passage through said shank to a second passage through said crown.

7. The bit of claim 1, wherein said tilting assembly is further comprised of:

drive elements protruding from said shank for rotating therewith; and cooperating driven elements engaged with said drive elements for rotating therewith while allowing pivoting motion about horizontal axes with respect thereto.

8. A bit assembly for use in earth boring at a distal end of a drill string, said bit comprising:

a shank for attachment of said bit assembly to the end of a drill string;

drive elements extending from said shank to rotate therewith for transmitting torque; and a crown below said shank and movably connected to said shank to rotate therewith responsive to rotation of said drive elements, said assembly being adapted to allow tilting of said crown with respect to said shank for cutting an earth formation;

said crown including a plurality of cutting elements disposed thereon for cutting said earth formation, and said tilt adaptation of said assembly affording substantially continuous engagement of said curing elements with said earth formation.

9. The bit of claim 8, wherein said drive elements are pivotably secured to said shank to rotate therewith.

10. The bit of claim 8, further comprising at least one seal for preventing leakage of drilling fluid conducted from a first passage through said shank to a second passage through said crown.

11. The bit of claim 8, further comprising a stop for limiting a tilt angle formed between a first axis of rotation of said shank and a second axis of rotation of said crown.

12. The bit of claim 8, further comprising a retainer operatively disposed between said shank and said crown for longitudinally securing said shank and said crown.

13. The bit of claim 12, wherein said retainer is comprised of a collar to which said crown is threadedly attached.

14. A drill bit assembly for drilling a borehole in subterranean formations, comprising:

a shank for attaching said drill bit assembly to a drill string;

a crown having an exterior including a face extending radially outwardly from a center to a gage, said gage defining the diameter of said borehole;

a plurality of cutting elements carried on said face of said crown, said cutting elements being disposed over said face to said gage; and a tilting assembly between said shank and said crown, said tilting assembly permitting tilting of said crown with respect to said shank while transmitting torque and axial loads from said drill string through said shank and to said crown;

said tilting assembly being comprised of:

at least one drive element attached to said shank and rotatable therewith; and at least one cooperating driven element pivotably engaged with said at least one drive element and rotatable with said at least one drive element to effect rotation of said crown.

15. A drill bit assembly for drilling a borehole in subterranean formations, comprising:

a shank for attaching said drill bit to a drill string;

a crown having an exterior including a face extending radially outwardly from a center to a gage, said gage defining the diameter of said borehole;

a plurality of cutting elements carried on said face of said crown, said cutting elements being disposed over said face to said gage; and a tilting assembly between said shank and said crown, said tilting assembly permitting tilting of said crown with respect to said shank while transmitting torque and axial loads from said drill string through said shank and to said crown;

said tilting assembly being comprised of:

circumferentially spaced drive elements disposed about said shank; and circumferentially spaced ways for receiving said drive elements in fixed rotational and sliding axial engagement therewith.

* * * * *

UNITED STATES PATENT AND TRADEMARK OFFICE
CERTIFICATE OF CORRECTION

PATENT NO. : 5,671,816
DATED : September 30, 1997
INVENTOR(S) : Tibbitts

It is certified that error appears in the above-identified patent and that said Letters Patent is hereby corrected as shown below:

On the Title Page, Under "U.S. Patent Documents", line 7, change "Wiggns, Jr." to --Wiggins, Jr.--;

In column 5, line 5, after "the" delete --.-- (period);

In column 6, line 45, change "nagivational" to --navigational--;

In column 7, line 44, change "legs" to --lugs--;

In column 8, line 20, change "string 21" to --string 18-- (both occurences);

In column 10, line 18, change "male" to --make--;

In column 10, line 45, change "120" to --20--;

In column 11, line 32, change "maybe" to --may be--;

In column 12, line 65, change "FIG. 27" to --FIG. 7--;

In column 13, line 44, change "48" to --148--;

In column 13, line 49, before "176" insert --diameter--;

In column 14, line 40, change "crown 14" to --crown 12--; and

In column 15, line 39, change "curing" to --cutting--.

Signed and Sealed this

Eighth Day of December, 1998

*Attest:*

BRUCE LEHMAN

*Attesting Officer*   *Commissioner of Patents and Trademarks*